US010457482B2

(12) United States Patent
Hognaland

(10) Patent No.: US 10,457,482 B2
(45) Date of Patent: Oct. 29, 2019

(54) METHOD FOR FETCHING A TARGET BIN STORED IN A STORAGE SYSTEM

(71) Applicant: Autostore Technology AS, Nedre Vats (NO)

(72) Inventor: Ingvar Hognaland, Nedre Vats (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

(21) Appl. No.: 15/757,577

(22) PCT Filed: Aug. 31, 2016

(86) PCT No.: PCT/EP2016/070476
§ 371 (c)(1),
(2) Date: Mar. 5, 2018

(87) PCT Pub. No.: WO2017/037095
PCT Pub. Date: Mar. 9, 2017

(65) Prior Publication Data
US 2018/0244467 A1 Aug. 30, 2018

(30) Foreign Application Priority Data
Sep. 4, 2015 (NO) .................................. 20151135

(51) Int. Cl.
*G06F 7/00* (2006.01)
*B65G 1/04* (2006.01)
(52) U.S. Cl.
CPC ......... *B65G 1/0464* (2013.01); *B65G 1/0478* (2013.01)
(58) Field of Classification Search
None
See application file for complete search history.

(56) References Cited

U.S. PATENT DOCUMENTS 7,591,630 B2 * 9/2009 Lert, Jr. ............... B65G 1/0492
414/807
2011/0106295 A1 * 5/2011 Miranda .............. B65G 1/1378
700/216
(Continued)

FOREIGN PATENT DOCUMENTS

WO 98/49075 A1 11/1998
WO 2013/167907 A1 11/2013
(Continued)

OTHER PUBLICATIONS

International Search Report of the International Searching Authority issued in PCT/EP2016/070476 dated Dec. 1, 2016 (6 pages).
(Continued)

*Primary Examiner* — Yolanda R Cumbess
(74) *Attorney, Agent, or Firm* — Osha Liang LLP

(57) ABSTRACT

A method for fetching a target bin stored in a storage system (100), wherein the storage system includes a three-dimensional storage grid containing a plurality of bins stacked in vertical stacks, supporting rails (13) on the grid structure, and a plurality of vehicles (1), controllably arranged to move individually on the supporting rails. The method is performed by a control device in the system and comprises controlling at least one non-target vehicle to operate as intermediate storage for a bin located vertically above the target bin (5); controlling a target vehicle to pick up the target bin, and controlling the at least one non-target vehicle and the target vehicle to be positioned adjacent to each other in a linear manner on the supporting rails. A corresponding storage system has also been disclosed.

8 Claims, 9 Drawing Sheets

(56) References Cited

U.S. PATENT DOCUMENTS

| | | | |
|---|---|---|---|
| 2015/0127143 A1 | 5/2015 | Lindbo et al. | |
| 2015/0175354 A1* | 6/2015 | Kharkover | B65G 1/06 |
| | | | 414/231 |
| 2016/0107848 A1* | 4/2016 | Baker | B65G 57/302 |
| | | | 414/788.8 |

FOREIGN PATENT DOCUMENTS

| | | |
|---|---|---|
| WO | 2014/116947 A1 | 7/2014 |
| WO | 2015/124610 A1 | 8/2015 |

OTHER PUBLICATIONS

Written Opinion of the International Searching Authority issued in PCT/EP2016/070476 dated Dec. 1, 2016 (7 pages).
International Preliminary Report on Patentability from PCT/EP2016/070476 dated Jul. 24, 2017 (15 pages).

\* cited by examiner

METHOD FOR FETCHING A TARGET BIN STORED IN A STORAGE SYSTEM

TECHNICAL FIELD

The present invention relates to the field of controlled storage systems and methods. More specifically, the invention relates to a method for fetching a target bin stored in a storage system and a storage system which includes a control device operating in accordance with the method.

BACKGROUND

A prior art storage structure and a prior art vehicle for use with the storage structure are illustrated in FIGS. 1 and 2, respectively. The storage structure 3 comprises a vehicle or robot 1 which is arranged to move on dedicated supporting rails 13 and to receive a storage bin 2 from a storage column 8 within a bin storage grid 15. The storage structure 3 includes a plurality of such vehicles 1 and a dedicated bin lift device 50, the latter being arranged to receive a storage bin 2 from the vehicle 1 at the top level of the bin storing grid 15 and to convey the storage bin 2 down in a vertical direction to a delivery station 60.

When a particular storage bin (denoted a "target bin") on a lower level within the storage structure is to be fetched, a vehicle 1 is controlled to pick up the upper bin from the stack of bins located vertically above the target bin, and then the vehicle 1 is controlled to unload and store this bin on a selected location on the upper level of the storage grid. This process may then be repeated until the target bin has become the upper bin in the vertical stack of bins. Then the target bin is fetched by the vehicle 1 and carried by the vehicle 1 to the bin lift device 50.

This system and operational method has certain disadvantages. First, the intermediate storage of bins on top of the upper level of the storage grid occupies area, resulting in obstructions for other vehicles that are intended to move as freely as possible on the top of the upper level of the storage grid. Second, a substantial amount of time is spent on the loading and unloading of bins associated with the intermediate storage. This in turn contributes to significant delays in the overall pick up time used to obtain a desired target bin.

WO-2013/167907 relates to a storage system suitable for storing multiple product lines in an automated warehouse environment. A first handling device is capable of lifting a plurality of containers from a stack in a single operation, and a second handling device is capable of lifting a single container and moving the container laterally.

This system has certain disadvantages. First, the first handling device, lifting a plurality of containers, causes a potentially tall stack of containers to be stored in the first handling device. This results in instability and risk for overturning, in particularly during acceleration/movement of the first handling device. Second, a special multi-bin handling device is needed for the lifting of a plurality of containers. The multi-bin handling device is different from the single-bin handling device used to retain the single container. The use of dedicated handling devices for various purposes results in a complex system.

An object of the present invention is to solve, or at least substantially alleviate, the above-described disadvantages of the prior art storage structures and methods.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an aspect, the invention provides a method for fetching a target bin stored in a storage system, wherein the storage system includes a three-dimensional storage grid containing a plurality of bins stacked in vertical stacks, supporting rails on the grid structure, and a plurality of vehicles, controllably arranged to move individually on the supporting rails, the method comprising:

controlling at least one non-target vehicle to operate as intermediate storage for a bin located vertically above the target bin;

controlling a target vehicle to pick up the target bin, and controlling the at least one non-target vehicle and the target vehicle to be positioned adjacent to each other in a linear manner on the supporting rails.

In another aspect, the invention provides a storage system, including a three-dimensional storage grid containing a plurality of bins stacked in vertical stacks; supporting rails on the grid structure; and a plurality of vehicles, controllably arranged to move on the supporting rails, and a control device, wherein the control device is configured to enable fetching of a target bin stored in the storage system by controlling at least one non-target vehicle to operate as intermediate storage for a bin located vertically above the target bin;

controlling a target vehicle to pick up the target bin; and controlling the at least one non-target vehicle and the target vehicle to be positioned adjacent to each other in a linear manner on the supporting rails.

Advantageous additional features are set forth in the dependent claims.

The invention provides, i.a., the advantage that the area on top of the upper level of the storage grid will not be blocked by stationary obstructions during retrieval of a desired target bin at a lower level in the storage structure. Hence, other vehicles are allowed to move more freely on the top of the upper level of the storage grid. Although non-target vehicles that serve as intermediate storage for a bin also take up area on the top of the storage grid, the non-target vehicles may be easily moved if necessary.

Another advantage of the invention is that the time spent on loading and unloading of bins that must be intermediately stored, will be substantially reduced, compared with the methods and systems of the background art. Hence, the invention increases the overall retrieval speed when fetching a desired target bin in the storage structure.

Particularly, the feature of controlling the at least one non-target vehicle and the target vehicle to be positioned adjacent to each other in a linear manner on the supporting rails, results in substantially improved retrieval speed when fetching a desired target bin in the storage structure.

Another advantage of the invention is that only one type of vehicle is needed. The one type of vehicle may serve as a target vehicle or a non-target vehicle, depending on its current mode of operation.

These and other characteristics of the invention will be clear from the following description of an exemplary embodiment, given as a non-restrictive example, with reference to the attached drawings.

DETAILED DESCRIPTION

Figure 1:
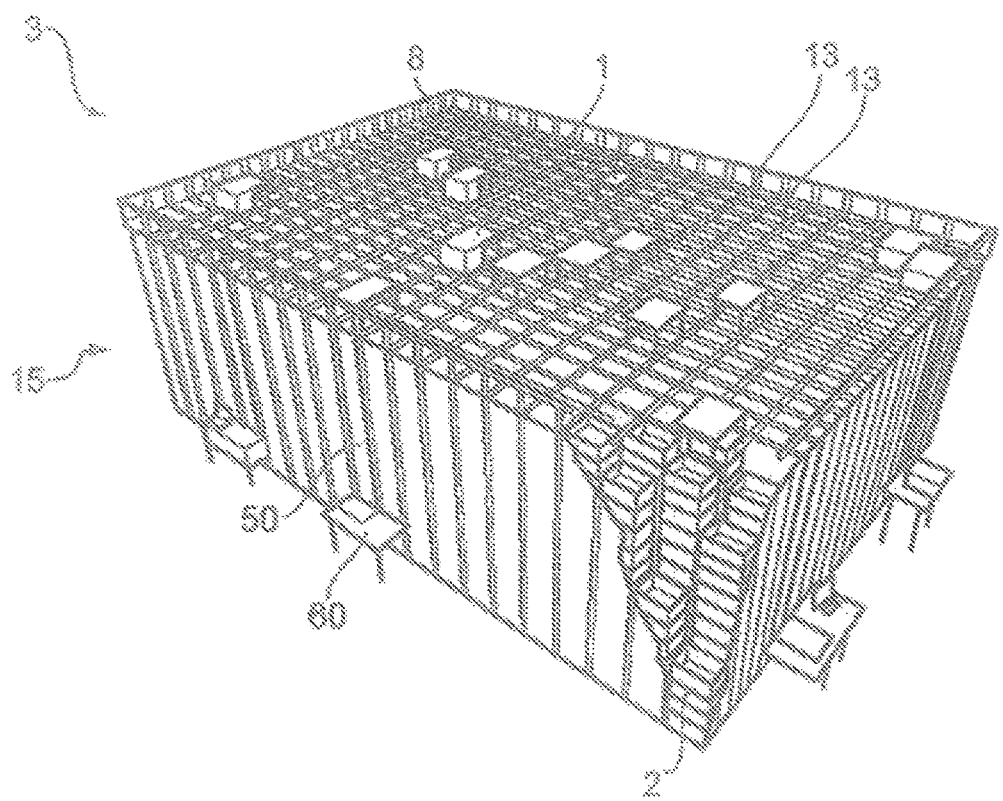
FIG. 1 is a perspective view of a prior art storage structure.
Figure 2:
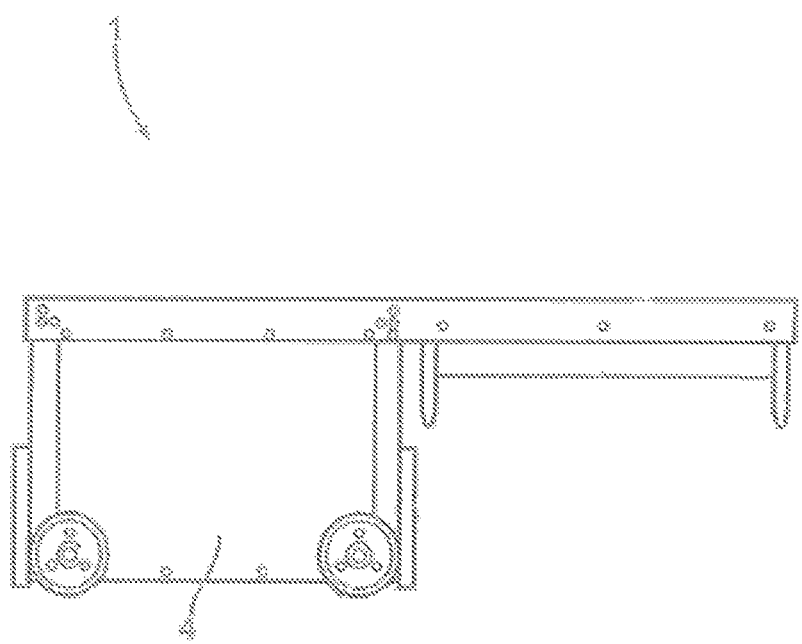
FIG. 2 is a sectional view of a prior art robot or vehicle forming part of a storage structure as illustrated in FIG. 1.

FIG. 1 and FIG. 2 have already been described above with reference to the section background of the invention.

Figure 3:
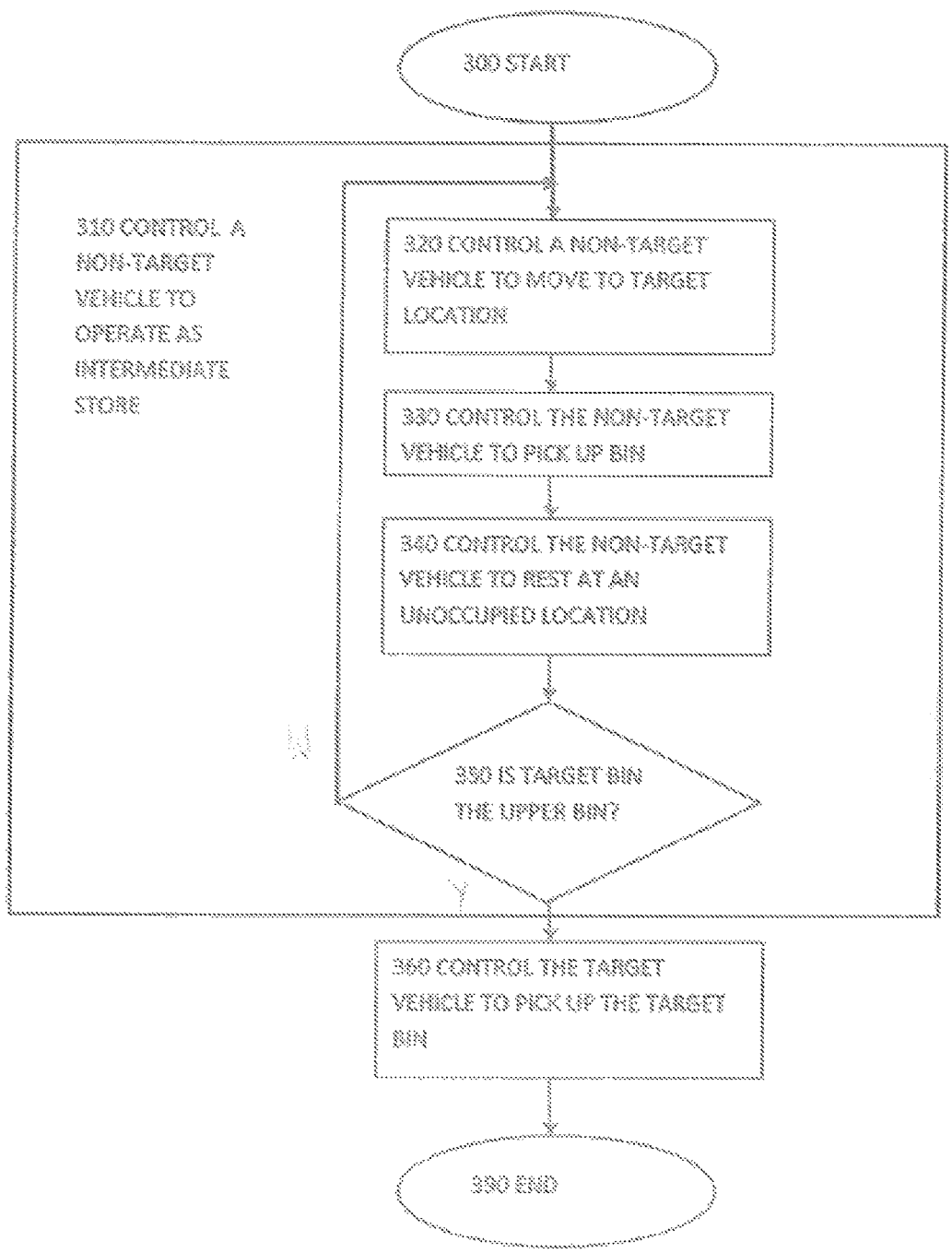
FIG. 3 is a schematic flow chart illustrating a method for fetching a target bin stored in a storage system.

FIG. 3 is a schematic flow chart illustrating a method for fetching a target bin stored in a storage system. The storage system includes a three-dimensional storage grid containing a plurality of bins stacked in vertical stacks, supporting rails on the grid structure, and a plurality of vehicles, controllably arranged to move on the supporting rails.

The method starts at the initiating step 300.

First, the non-target vehicle control step 310 is performed. The non-target vehicle control step 310 includes controlling at least one non-target vehicle to operate as intermediate storage for at least one bin located vertically above the target bin.

As illustrated, the non-target vehicle control step 310 may include several substeps, in order to obtain its task of controlling at least one non-target vehicle to operate as intermediate storage for at least one bin located vertically above the target bin. While other alternatives are also possible, the non-target vehicle control step 310 may, by example, include the following:

- a first controlling substep 320 of controlling the non-target vehicle to move to a target location above the target bin;
- a second controlling substep 330 of controlling the non-target vehicle to pick up a bin from the vertical stack at the target location;
- a third controlling substep 340 of controlling the non-target vehicle to rest at a neighbour location; and
- a determination step 350 of determining if the target bin has become the upper bin in the vertical stack at the target location, and if this is not true, repeating the first 320, second 330 and third 340 controlling steps.

Next, the target vehicle control step 360 is performed. The target vehicle control step 360 includes controlling the target vehicle to pick up the target bin at the target location.

During the above process, the at least one non-target vehicle and the target vehicle are controlled to be positioned adjacent to each other in a linear manner on the supporting rails. "Linear manner" may in this context mean that the vehicles are positioned, or are moving, along a line which coincides with or is parallel with the supporting rails on the grid structure. This leads to a particular efficient operation, since it reduces the time needed from one vehicle's performance of a task at the target location to the next vehicle's performance of a task at the target location.

Although not illustrated in detail in FIG. 3, the target vehicle control step 360 may include the following substeps:

- a first substep of controlling the target vehicle to move to the target location; and
- a second substep of controlling the target vehicle to pick up the target bin from the vertical stack at the target location.

The method may be terminated at the terminating step 390, subsequent to the target vehicle control step 360.

Advantageously, the method may include a further step, performed subsequent to the target vehicle control step 360 and prior to the terminating step 390, the further step including controlling the at least one non-target vehicle to return and unload its bin to the target location. In case of a plurality of non-target vehicles holding non-target bins, the non-target vehicles are advantageously controlled to return and unload their bins to the target location in opposite order, compared to the order in which the non-target vehicles picked up their respective non-target bins in the repeated sequence of steps 320, 330, 340 and 350.

A more detailed example of how the method can be practiced has also been presented below with reference to FIGS. 5-9.

Figure 4:
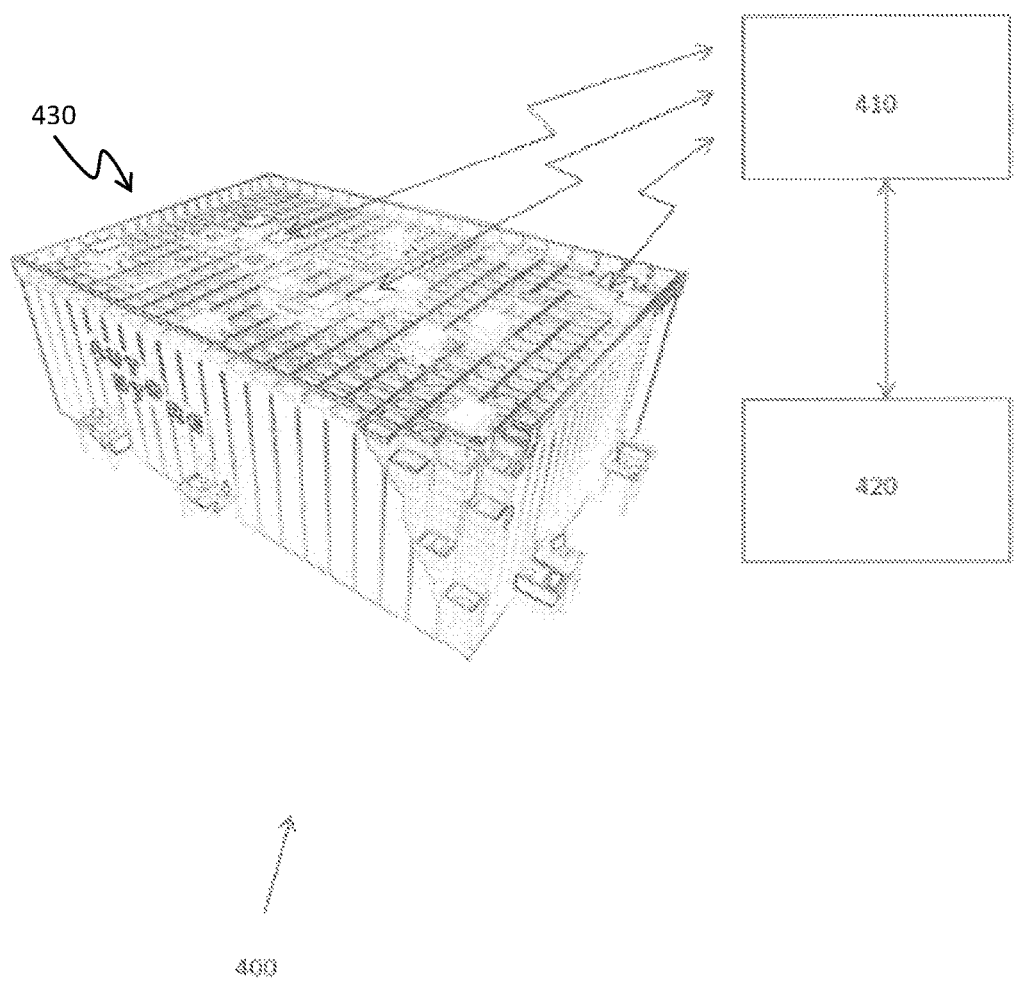
FIG. 4 is a schematic block diagram illustrating a storage system.

FIG. 4 is a schematic block diagram illustrating a storage system, in particular including communication elements that are suitable in a system and method as disclosed herein.

The system 400 includes a storage structure 430 which may be similar to the storage structure 3 referred to in the section Background of the invention above.

Hence, the storage system 400 includes a three-dimensional storage grid containing a plurality of bins stacked in vertical stacks; supporting rails 13 on the grid structure; and a plurality of vehicles 1, controllably arranged to move on the supporting rails 13.

To make the vehicles controllable, a control device 420 is provided. In order to provide communication between the vehicles and the control device, the system may include a communication device 410, which facilitates communication, preferably wireless communication, such as digital RF communication, between the control device 420 and each vehicle. The communication device 410 is further communicatively connected to the control device 420, either by wire or wireless communication means. The communication device 410 and the control device 420 may be separate units or combined into one unit.

Each vehicle 1 is arranged to move on supporting rails and to receive a storage bin from a storage column within the bin storing grid. For instance, each, several or all the vehicles 1 may be of the type as illustrated in FIG. 2 and referred to in the section Background of the invention above. Alternatively, each, several or all the vehicles may be of a type that includes a vehicle body 4 and a cavity 20 arranged centrally within the vehicle body, the cavity 20 being arranged to receive and hold a storage bin, see FIG. 6.

Each vehicle is provided with rolling means, such as wheels. Typically, the vehicle includes a first and a second set of wheels, each set including four wheels, and the first set of wheels being arranged perpendicularly to the second set of wheels. Such an arrangement may enable the vehicle to move along supporting rails extending in a first direction on the grid structure and along supporting rails extending in a second direction on the grid stricture. The first and second directions of the supporting rails are also advantageously perpendicular. The vehicle may include a controllable mechanism for selectively displacing, from the rails, either the first or second set of wheels. This arrangement enables controllable, quick change of vehicle direction between the first direction and the second direction.

At least one wheel in a set of wheels is driven by a motor, typically an electric motor. The displacing mechanism may also be actuated electrically. The motor and other energy-consuming equipment on the vehicle is typically powered by a rechargeable battery onboard the vehicle.

To make the vehicles controllably arranged to move as desired on the supporting rails, each vehicle is advantageously provided with local control/processing means which provides the detailed control of the rotation of wheels and the controllable displacing mechanism. Sensors may also be arranged in the vehicles and connected to the control/processing means on the vehicle, and signals provided by such sensors may be used in the local control provided on the vehicle. Such sensors may, i.a, include proximity and position sensors, e.g. optical sensors.

Each vehicle further includes a controllable mechanism which enables the vehicle to pick up (or load) a bin from a location at the storage grid, and/or to drop off (or unload) a bin to a location at the storage grid.

The control/processing means on the vehicle provides local control of i.a. the speed and rolling direction of wheels, and of the loading/unloading mechanism. This may be achieved by configuring suitable software in a memory included in the vehicle's control/processing means, enabling the control/processing means to control i.a. the rotational direction, speed and acceleration of the vehicle's wheel(s).

The control/processing means on the vehicle may also be configured to receive instructions or requests from a remote control device, the instructions or requests being on a higher conceptual level than the detailed control of direction, speed, etc. For instance, the control/processing means on the vehicle may be enabled to receive a request for moving the vehicle to a particular position on the storage grid, or to pick up a bin from the grid at a particular position on the storage grid, and to control the vehicle to move and act accordingly.

Further with reference to FIG. 4, the storage system 400 also includes a control device 420, which may be a computer device, including, i.e., a processing device and a memory which includes a computer program configured to be executed on the processing device.

The control device 420 is configured to transmit instructions or requests to each vehicle 1 via the communication device 410. The control device 420 holds information about each vehicle's position, load status, etc. in an associated memory. Hence, the control device 420 is enabled to transmit instructions or request on a higher conceptual level to each vehicle, as already described above.

The control device 420 may be configured to identify a "target vehicle", i.e., a vehicle 1 that is intended to hold a particular bin to be fetched in the storage grid, denoted the "target bin". To this end, the control device 420 may for instance be configured to select a vehicle 1 that is currently unoccupied and determine that vehicle to be a "target vehicle".

The control device 420 may also be configured to identify at least "non-target vehicle", i.e. a vehicle 1 that is intended to be used as an intermediate storage for bins that must be removed in order to obtain the target bin in the storage grid. To this end, the control device 420 may be configured to select a vehicle 1 that is currently unoccupied and determine that vehicle 1 to be a "non-target vehicle". The control device 420 may also be configured to control the non-target vehicles and the target vehicle to place themselves in a set of positions wherein they are prepared to perform an operation of fetching the target bin. In particular, the control device 420 may be configured to control the non-target vehicles and the target vehicle to place themselves adjacent to each other on the supporting rails 13 in a linear manner, and in such a way that a non-target vehicle is located vertically above the target bin.

Alternatively, the process of identifying a "target vehicle" and "non-target vehicles" may be distributed to the control/processing means in the vehicles 1, since each vehicle 1 holds status information which indicates if the vehicle 1 is currently busy, i.e., unavailable for service. or unoccupied, i.e., available for service.

By these or similar provisions, the control device 420 is configured to fetch a target bin stored in the storage system 400 by controlling at least one non-target vehicle to operate as intermediate storage for at least one bin located vertically above the target bin; controlling a target vehicle to pick up the target bin, and controlling the at least one non-target vehicle and the target vehicle to be positioned adjacent to each other in a linear manner on the supporting rails 13.

In a particular aspect of the storage system 400, the control device 420 is configured to controlling the at least one non-target vehicle to operate as intermediate storage for at least one bin located vertically above the target bin. More specifically, the control device 420 may be configured to control a non-target vehicle to move to a target location above the target bin; control the non-target vehicle to pick up a bin from the vertical stack at the target location; to control the non-target vehicle to a neighbour location; and to repeat the above controlling steps until the target bin has become the upper bin in the vertical stack at the target location.

Advantageously, in this aspect, the control device may also be configured to control the target vehicle to pick up the target bin by: controlling the target vehicle to move to the target location; and controlling the target vehicle to pick up the target bin from the vertical stack at the target location.

In any of the above aspects, the control device 420 may be further configured to control the non-target vehicles to return and unload their bins to the target location.

In this case the control device may also be further configured to control the non-target vehicles to return and unload their bins to the target location in opposite order.

The control device 420 may include memory that holds and updates data representing various information about the storage system. Such information may include current position and identification of storage bins stored in the storage structure, as well as current position and identification of vehicles that move or are stationary disposed on the supporting rails 13 on the grid structure.

FIGS. 5-9 are schematic diagrams illustrating an exemplary operation of the method and system.

Figure 5:
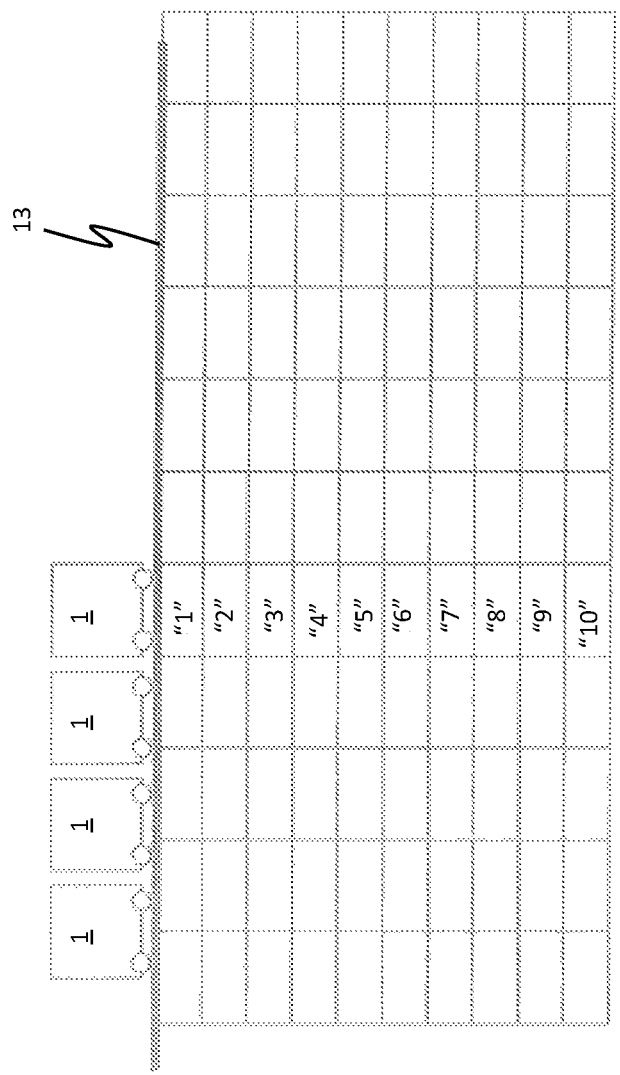
FIG. 5-9 are schematic diagrams illustrating an exemplary operation of the method and system.

FIG. 5 illustrates an initiate situation wherein a number of vehicles 1 (four shown) are available on the top of the storage grid structure. The vehicles are arranged to move on supporting rails 13 on the top of the storage grid structure. A plurality of bins (ten shown) are stacked in a vertical stack in the three-dimensional storage grid structure. Of these bins, the bin denoted by number "5" is determined to be a target bin.

FIG. 5 also illustrates that a non-target vehicle (the rightmost vehicle in FIG. 5) has been controlled to move to a target location above the target bin.

Figure 6:
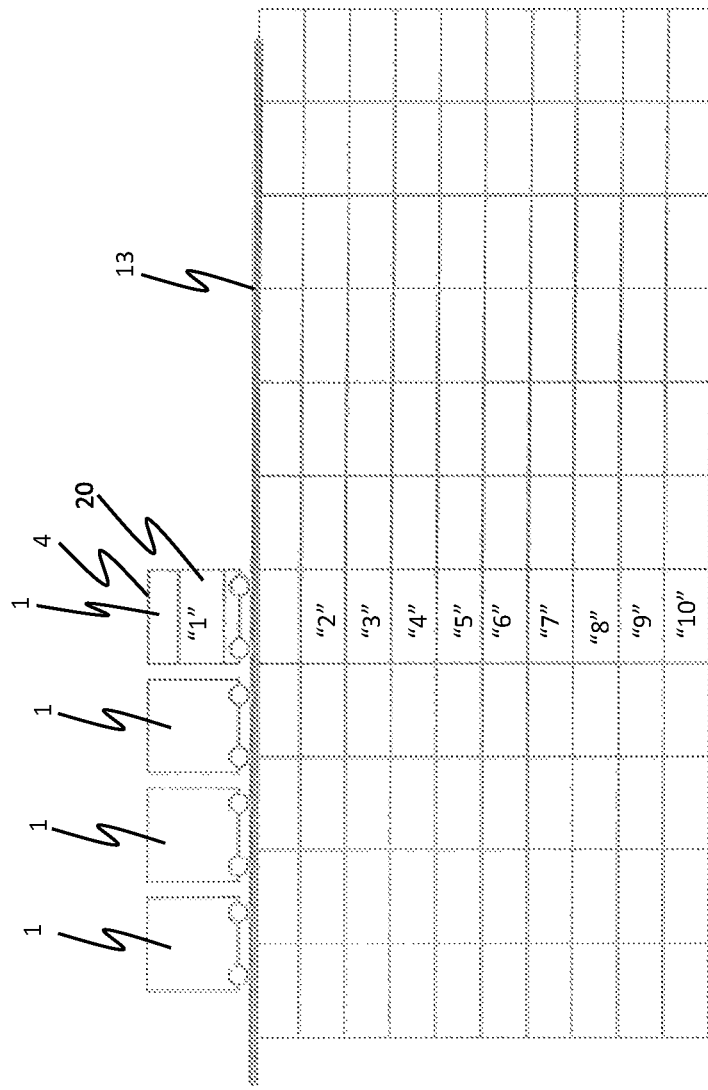

FIG. 6 illustrates that the non-target vehicle (the rightmost vehicle in FIG. 6), located above the target bin, has been controlled to pick up a bin (denoted by number "1").

Figure 7:
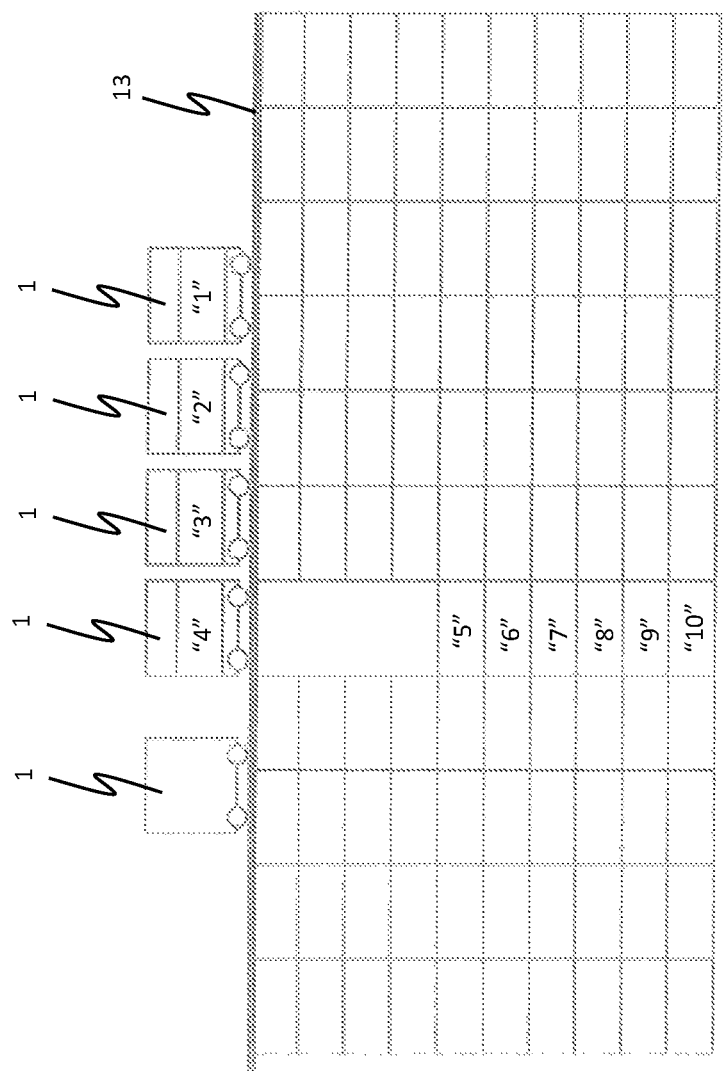

FIG. 7 illustrates that the non-target vehicle that holds the bin denoted by number "1" has been controlled to rest at a neighbour position on the storage grid. The controlling steps have then been repeated three times. Hence, further 3 non-target vehicles have been controlled to move to the target location above the target bin and been controlled to pick up a bin from the vertical stack at the target location, and been controlled to rest at a neighbour location. In the situation illustrated at FIG. 7, the target bin (denoted "5") has become the upper bin in the vertical stack at the target location. Hence, the repeating of controlling steps is terminated.

Figure 8:
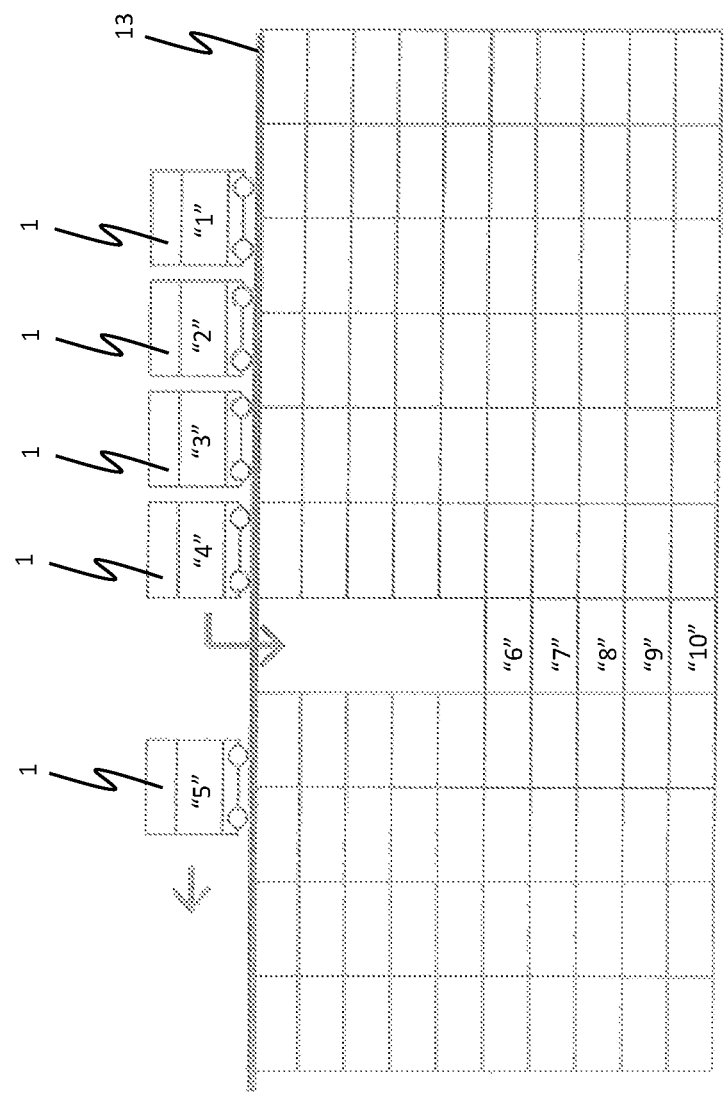

FIG. 8 illustrates that the target vehicle (the leftmost vehicle in FIG. 8) has been controlled to move to the target location and been controlled to pick up the target bin (denoted "5"). Consequently, the target vehicle has fetched the target bin and may carry the target bin to another location, such as a bin lift device which may cause the target bin to be conveyed to a delivery station.

Figure 9:

FIG. 9 illustrates that the non-target vehicles have returned and unloaded their bins to the target location. Since the non-target vehicles return and unload their bins to the target location in opposite order, the result will be that the non-target bins appear in the grid structure in their original order. Only the target bin (denoted "5") is missing.

As can be noted from any one of FIGS. 6, 7, 8 and 9, all the non-target vehicles and the target vehicle are positioned adjacent to each other in a linear manner on the supporting rails 13 at any time during the process of retrieving the target bin. This leads to a particular efficient operation, since it reduces the time needed from one vehicle's 1 performance of a task at the target location to the next vehicle's 1 performance of a task at the target location.

In the above detailed description, various aspects of the method and system have been described with reference to the illustrated exemplary embodiment. Various modifications and variations of the exemplary embodiment, as well as other embodiments of the method and system, are considered to lie within the scope of the present invention as defined in the claims.

The invention claimed is:

1. A method for fetching a target bin stored in a storage system, wherein the storage system comprises:
   a three-dimensional storage grid containing a plurality of bins stacked in vertical stacks,
   supporting rails on the three-dimensional storage grid, and
   a plurality of vehicles, wherein the plurality of vehicles move individually on the supporting rails,
   the method comprising:
      controlling a plurality of non-target vehicles, wherein each of the non-target vehicles operates as an intermediate storage for a single bin located vertically above a target bin;
      controlling a target vehicle to pick up the target bin, and
      controlling the plurality of non-target vehicles and the target vehicle to be positioned adjacent to each other in a linear manner on the supporting rails, wherein the plurality of non-target vehicles and the target vehicle are a same type of vehicle able to lift only a bin at a time,
   wherein the step of controlling each of the plurality of non-target vehicles to operate as the intermediate storage for the single bin located vertically above the target bin further comprises:
      controlling the non-target vehicle to move to a target location above the target bin;
      controlling the non-target vehicle to pick up a single bin from the vertical stack at the target location;
      controlling the non-target vehicle to rest at a neighbor location; and
      determining if the target bin has become an upper bin in the vertical stack at the target location, and if this is not true, repeating the controlling steps until the target bin has become the upper bin in the vertical stack at the target location.

2. The method according to claim 1, wherein the step of controlling the target vehicle to pick up the target bin comprises:
   controlling the target vehicle to move to the target location; and
   controlling the target vehicle to pick up the target bin from the vertical stack at the target location.

3. The method according to claim 1, further comprising controlling each of the plurality of non-target vehicles to return and unload the single bin to the target location in an opposite order compared to the order in which the non-target vehicles picked up the single bin in the controlling steps.

4. The method according to claim 1, wherein each of the non-target vehicles and the target vehicle has a vehicle body and a cavity arranged centrally within the vehicle body to receive and hold a storage bin.

5. A storage system, comprising:
   a three-dimensional storage grid containing a plurality of bins stacked in vertical stacks;
   supporting rails on the grid structure;
   a plurality of vehicles controllably arranged to move on the supporting rails; and
   a control device, wherein the control device is configured to enable fetching of a target bin stored in the storage system by:
      controlling a plurality of non-target vehicles, wherein each of the non-target vehicles operates as an intermediate storage for a single bin located vertically above the target bin;
      controlling a target vehicle to pick up the target bin; and
      controlling the plurality of non-target vehicles and the target vehicle to be positioned adjacent to each other in a linear manner on the supporting rails, wherein the plurality of non-target vehicles and the target vehicle are the same type of vehicle able to lift only a bin at the time,
   wherein the control device is configured to control each of the plurality of non-target vehicles to operate as intermediate storage for the single bin located vertically above the target bin by:
      controlling the non-target vehicle to move to a target location above the target bin;
      controlling the non-target vehicle to pick up a single bin from the vertical stack at the target location;
      controlling the non-target vehicle to rest at a neighbour location; and
      determining if the target bin has become an upper bin in the vertical stack at the target location, and if this is not true, repeating the controlling steps until the target bin has become the upper bin in the vertical stack at the target location.

6. The storage system according to claim 5, wherein the control device is configured to control the target vehicle to pick up the target bin by:
   controlling the target vehicle to move to the target location; and
   controlling the target vehicle to pick up the target bin from the vertical stack at the target location.

7. The storage system according to claim 5, wherein the control device is further configured to
   control each of the plurality of non-target vehicles to return and unload the single bin to the target location in an opposite order compared to the order in which the non-target vehicles picked up the single bin in the controlling steps.

8. The storage system according to claim 5, wherein each of the non-target vehicles and the target vehicle has a vehicle body and a cavity arranged centrally within the vehicle body to receive and hold a storage bin.

* * * * *